US008900393B2

(12) United States Patent
Adie

(10) Patent No.: US 8,900,393 B2
(45) Date of Patent: Dec. 2, 2014

(54) HIGH BULK LAMINATED BOARD USING EMBOSSED PLIES AND THE METHOD OF MANUFACTURE

(75) Inventor: Victor Adie, Bristol (GB)

(73) Assignee: 3A Composites GmbH, Osnabruck (DE)

( * ) Notice: Subject to any disclaimer, the term of this patent is extended or adjusted under 35 U.S.C. 154(b) by 575 days.

(21) Appl. No.: 12/527,262

(22) PCT Filed: Feb. 14, 2008

(86) PCT No.: PCT/GB2008/050097
§ 371 (c)(1),
(2), (4) Date: Aug. 14, 2009

(87) PCT Pub. No.: WO2008/099217
PCT Pub. Date: Aug. 21, 2008

(65) Prior Publication Data
US 2010/0028611 A1    Feb. 4, 2010

(30) Foreign Application Priority Data

Feb. 14, 2007  (GB) .................................. 0702893.9
Jul. 27, 2007  (GB) .................................. 0714786.1

(51) Int. Cl.
*B32B 3/12*     (2006.01)
*B32B 38/06*    (2006.01)
*B31F 1/07*     (2006.01)
*B32B 29/00*    (2006.01)
*B32B 37/20*    (2006.01)

(52) U.S. Cl.
CPC ................. *B32B 37/20* (2013.01); *B32B 38/06* (2013.01); *B31F 2201/0787* (2013.01); *B31F 2201/0769* (2013.01); *B31F 1/07* (2013.01); *B32B 2317/12* (2013.01); *B32B 29/00* (2013.01); *B32B 2317/16* (2013.01); *B31F 2201/0766* (2013.01)
USPC ........... 156/219; 156/206; 156/210; 156/222; 156/264; 156/290; 156/292; 156/535; 428/166

(58) Field of Classification Search
USPC ......... 156/219, 210, 206, 209, 222, 264, 290, 156/292, 535; 428/166
See application file for complete search history.

(56) References Cited

U.S. PATENT DOCUMENTS 3,249,659 A * 5/1966 Voelker ........................ 264/46.2
3,741,859 A   6/1973 Wandel
(Continued)

FOREIGN PATENT DOCUMENTS

FR  2 775 698 A1  9/1999
WO  99/15332 A1   4/1999

*Primary Examiner* — Margaret Squalls
(74) *Attorney, Agent, or Firm* — The Webb Law Firm

(57) ABSTRACT

A high bulk laminated board is produced using one or more embossed plies. A method of producing the laminated board comprises: embossing first and second plies to produce first embossed projections extending from first sides of the first and second plies; placing adhesive on the first embossed projections on the first side of each of the first and second embossed plies; bringing the first and second plies together such that the first embossed projections on the first and second embossed plies are aligned; applying pressure to the first side of each of the first and second embossed plies to cause the first and second embossed plies to adhere together to form a composite ply; and adhering first and second flat outer plies onto first and second sides of the composite ply. Corresponding apparatus is provided.

8 Claims, 5 Drawing Sheets

(56) References Cited

U.S. PATENT DOCUMENTS

| | | | |
|---|---|---|---|
| 3,755,038 A * | 8/1973 | Atteck | 156/197 |
| 4,428,993 A * | 1/1984 | Kohn et al. | 428/117 |
| 5,830,548 A * | 11/1998 | Andersen et al. | 428/36.4 |
| 5,948,198 A | 9/1999 | Blyt | |
| 6,165,585 A | 12/2000 | Trokhan | |
| 6,361,601 B1 | 3/2002 | Schulz | |
| 6,511,567 B1 * | 1/2003 | Ruggie et al. | 156/205 |
| 6,599,614 B1 | 7/2003 | Roussel et al. | |
| 2003/0136079 A1 * | 7/2003 | Ruggie et al. | 52/784.1 |

\* cited by examiner

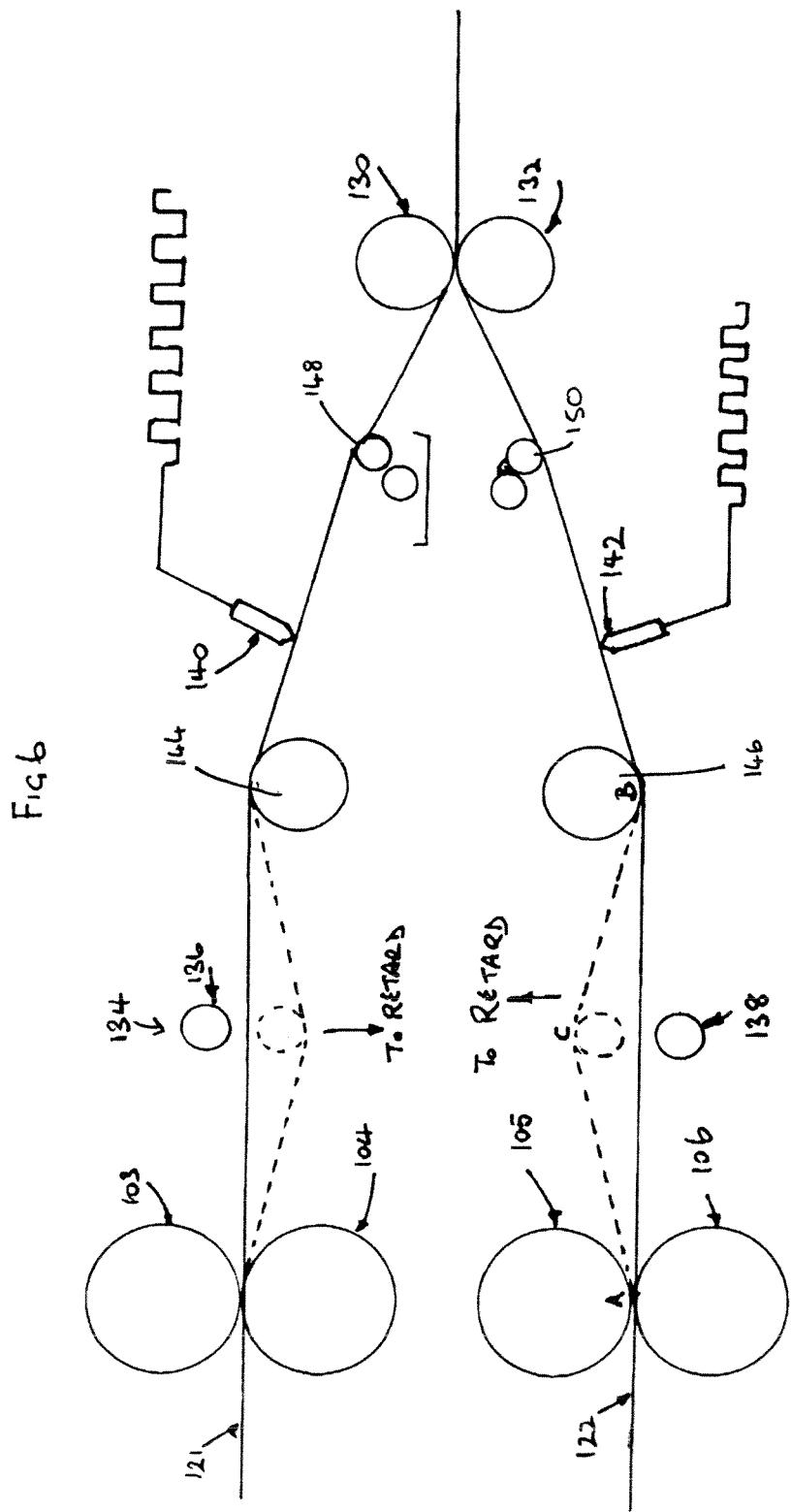

HIGH BULK LAMINATED BOARD USING EMBOSSED PLIES AND THE METHOD OF MANUFACTURE

BACKGROUND OF THE INVENTION

1. Field of the Invention

The present invention relates to a high bulk laminated board, particularly but not exclusively to a high bulk laminated board for use in the production of large displays, show-cards, graphic panels and the like. The present invention also relates to an apparatus for producing high bulk laminated board and a method relating thereto.

2. Description of Related Art

Foam centred board ("Foam Board") is commonly used for the production of large displays, show-cards, graphic panels, and the like, where high rigidity, thickness and low weight, combined with high quality printable facings are required.

The most commonly used thicknesses of Foam Board are 3 and 5 mm. Foam Board typically comprises a core of expanded polystyrene or polyurethane foam, lined both sides with graphic board such as coated solid bleached sulphate board (SBS) or coated folding boxboard (GC2).

There are major environmental disadvantages in using foam board as follows:
1) It is impossible to recycle, being a composite of plastic foam centre and cellulose based liners.
2) The plastic foam centre is produced from petrochemicals which are a finite resource.
3) The only methods of disposal are:
   i) landfill, which is burying problems for future generations; and
   ii) incineration, which generates carbon dioxide and, if not carried out expertly, hazardous chemical compounds.

There is a growing demand for an environmentally benign alternative based on 100% cellulose fibre which can be recycled.

One type of board which has been considered as an alternative to Foam Board is corrugated board, typically in the form of double faced B, C and E or double wall EB, EE and NE flute constructions.

However, corrugated board is not able to fulfil all the criteria for use in large displays, show-cards, graphic panels, and the like as it has the following disadvantages:
1) It is prone to bowing because of moisture imbalance caused by the method of production resulting from the lamination of the face liners at different points under differing pressures.
2) The flutes tend to show through the face liners so causing flute shadow when printed.
3) In order to provide a smoother printing surface with less flute shadow, composite constructions such as EB or NE are made with one side having a much finer flute profile. This is an imbalanced construction which is liable to bow.
4) There is a tendency for more bruising and wash boarding of the face liner to show on one side of the board which detracts from the image when it has to be printed both sides.
5) Corrugated board is much less rigid in the cross flute direction and is more prone to folding along the flutes.
6) It is difficult to produce constructions with creases along the flutes as the board tends to roll either side of the crease line.
7) Corrugated board has a high moisture level when first produced and this can lead to bowing.
8) The choice of face liners is restricted to those that will withstand the high temperatures and pressures used in the manufacture of the board.

It is also known that globular (cup-and-ball) embossed paper is used to produce a multi-ply paper construction for use in the confectionery market commonly known as Cushion Pad. As the name suggests the product is designed to be extremely light and compressible. Typically the grammage of papers used is less than 50 gsm with the total construction weight of a 5 ply being less than 200 gsm. This product has no rigidity.

The method of production is not controlled so that the embossed patterns of the plies are not registered to each other and a 5 ply construction has to have an intermediate ply of un-embossed paper.

An aim of the present invention is to address the problems that the prior art has described herein or elsewhere.

SUMMARY OF THE INVENTION

An aim of the invention is to enable the production of strong and rigid board that is light in comparison to its caliper with improved, controllable mechanical properties for various purposes, particularly including those which will serve as environmentally better alternatives to Foam boards.

A particular aim of the present invention is to provide an environmentally benign alternative to foam board for the production of large displays, show-cards, graphic panels etc. where high rigidity, thickness and low weight, combined with high quality printable facings are desired.

According to the present invention there is provided an apparatus and method as set forth in the appended claims. Preferred features of the invention will be apparent from the dependent claims, and the description which follows.

According to a first aspect of the invention there is provided a method of producing a laminated board comprising: embossing first and second plies to produce first embossed projections extending from first sides of the first and second plies; placing adhesive on the first embossed projections on the first side of each of the first and second embossed plies; bringing the first and second plies together such that the first embossed projections on the first and second embossed plies are arranged with a predetermined alignment; applying pressure to the first side of each of the first and second embossed plies to cause the first and second embossed plies to adhere together to form a composite ply; and adhering first and second flat outer plies onto first and second sides of the composite ply.

Preferably, the first and second plies are brought together such that the tops of the first embossed projections on the first and second embossed plies are aligned; and the pressure is applied to the tops of the embossed projections on the first side of each of the first and second embossed plies.

Preferably, the first and second plies are brought together such that the tops of the first embossed projections on the first and second embossed plies are offset in the plane of the finished board by a predetermined distance.

Preferably, the embossing of first and second plies includes producing embossed projections from second sides of the first and second plies.

Preferably, the method further comprises conditioning the first and second plies by the addition of steam before embossing the first and second plies. Preferably, the conditioning of both the first and second plies is carried out at substantially equal distances from the location at which embossing of the plies takes place.

Preferably, the placing of adhesive on both the first and second plies is carried out at substantially equal distances from the location at which pressure is applied to the tops of the embossed projections. Preferably, identical quantities of adhesive are placed on the first and second plies.

Preferably, adhesive is applied to the first embossed projections, and more preferably to the tops of the first embossed projections.

Preferably, the method further comprises drying the adhesive on the composite ply before adhering the outer plies to the composite ply. The drying of the adhesive preferably takes place from both sides of the composite ply.

Preferably, the adhering of the outer plies onto the composite ply includes applying adhesive to both sides of the composite ply and pressing each outer ply to a respective first or second side of the composite ply.

Preferably, the applying of adhesive to each side of the composite ply takes place at respective locations which are spaced at substantially equal distances from a location for pressing the outer plies to the composite ply. Preferably, identical quantities of adhesive are placed on each side of the composite ply.

Preferably, the method can further comprise pre-heating each outer ply before pressing each said outer ply to a respective side of the composite ply.

Preferably, the pre-heating of the outer plies takes place at locations which are spaced at substantially equal distances from the location for pressing the outer plies to the composite ply.

Preferably, the pressing of each outer ply to a respective side of the composite ply includes bringing the outer plies into contact simultaneously with the composite ply to bond the outer plies to the composite ply.

Preferably, each step of the method is carried out on the first and second plies and/or the outer plies simultaneously and symmetrically about the plane of contact of the first and second plies.

Preferably, the method further comprises introducing a plain un-embossed centre ply between the first and second embossed plies when pressure is applied to cause the first and second embossed plies to adhere together via the centre ply to form a composite ply. This produces a 5 ply board.

Preferably, the method comprises a step of aligning the first and second embossed plies by adjusting the path length of the first and/or second embossed plies.

Preferably, the step of aligning the first and second embossed plies comprises continuously monitoring the relative position of the first and second embossed plies and carrying out the step of adjusting the path length of the first and/or second embossed plies when the relative position of the first and second embossed plies deviates from a desired relative position in the plane of the finished board.

Preferably, the method comprises a step of aligning the first and second embossed plies in a desired relative position by adjusting the speed of the first embossed ply with respect to the second embossed ply or vice versa for a short transient period. Preferably, the speed of the first or second embossed ply is adjusted by adjusting the speed of embossing rollers for embossing the first or second ply respectively.

According to a second aspect of the invention there is provided an apparatus for producing a laminated board comprising: embossing means to produce embossed projections extending from first sides of first and second plies respectively; first adhesive dispensing means to place adhesive on portions of the first side of each of the first and second embossed plies; first pressure means to press the portions of the first sides of the first and second embossed plies together to form a composite ply at a pressure nip; second adhesive dispensing means to place adhesive on the first and second sides of the composite ply; and second pressure means to press first and second outer plies onto the first and second sides of the composite ply.

Preferably, the first adhesive dispensing means places adhesive on the top of the first side of each of the first and second embossed plies; and the first pressure means presses the tops of the projections together.

Preferably, the embossing means is further adapted to produce embossed projections extending from second sides of first and second plies respectively.

Preferably, the embossing means comprises two pairs of embossing rollers, each pair of embossing rollers comprising first and second rollers intermeshing to emboss a respective first or second ply. The rotational axes of each of the embossing rollers preferably lie in a single vertical plane, a pressure nip being formed between the lower roller of the upper pair of rollers and the upper roller of the lower pair of rollers, the lower roller of the upper pair of rollers and the upper roller of the lower pair of rollers forming the pressure nip of the first pressure means.

Preferably the embossing means are adapted to emboss the plies with identical globular (cup-and-ball) patterns, although any other suitable pattern is envisaged. The embossing rollers may be steam heated to facilitate deep embossing. The embossing rollers are preferably geared together so that they intermesh.

Preferably, each pair of embossing rollers is mounted in a frame so that a first one of said pair of rollers can be moved vertically relative to a second one of said pair of rollers to adjust the size of the pressure nip between the first and second rollers Preferably, a vertical slide mounting is provided for one of the frames to enable the first pair of rollers to move relative to the second pair of rollers to adjust the size of the pressure nip between the lower roller of the upper pair of rollers and the upper roller of the lower pair of rollers.

Preferably, one of the frames is adapted to move away from the other frame such that the apparatus can be used to produce a laminate board having a single embossed ply.

Preferably, the first roller of the first pair of rollers is geared by a jockey wheel tensioned, continuous chain via a reversing gear to the first roller of the second pair of rollers so that they run at the same speed. The sprocket wheel over which the chain runs on the first roller of the first pair of rollers may be rotated and locked in position to allow precise positioning of the first roller of the second pair of rollers in relation to the first roller of the first pair of rollers.

Preferably, the first roller of each pair of rollers is aligned so that the high points of their embossed patterns face one another mirror fashion and form the nip to press the first and second plies together to form a laminated composite ply.

Preferably, all the rollers are driven.

Preferably, the apparatus comprises means for conditioning the first and second plies by means of steam before the first and second plies are embossed. Preferably the conditioning means comprises a first conditioning station associated with the first ply and a second conditioning station associated with the second ply, the first and second conditioning stations being positioned so that the distance between each conditioning station and the embossing means for each ply are substantially equal.

The conditioning means may be perforated pipes.

Preferably, the first adhesive dispensing means comprises a first gluing station associated with the first ply and a second gluing station associated with the second ply, the gluing stations being positioned so that the distance between each gluing station and the pressure nip are the same.

Preferably, the plies are supported on the first rollers which run against first gluing stations. Each first gluing station may comprise at least one roller which is preferably smooth. Each first gluing station may apply a water based adhesive. Preferably, identical quantities of adhesive are placed on the first and second plies. The rollers preferably contact only the raised pattern of the embossed plies.

Preferably, the apparatus is provided with at least one dryer to dry the first adhesive on the composite ply.

Preferably, at least one dryer dries the composite ply from both sides.

Preferably, the pre-heating means are provided to pre-heat the outer plies before they are fed to the second pressure means.

Preferably, the pre-heating means comprise first and second preheating means located at substantially equal distances from the second pressure means.

Preferably, the second adhesive dispensing means is arranged to apply adhesive to both sides of the composite ply simultaneously. Preferably, identical quantities of adhesive are placed on each side of the composite ply.

Preferably, the second adhesive dispensing means is adapted to apply adhesive only to the raised projections of the embossed first and second plies.

Preferably, the second pressure means is adapted to bring the first and second outer plies into simultaneous contact with the composite ply to bond the outer plies to the composite ply.

Preferably, the second pressure means comprises two sets of horizontally mounted rollers, over which continuous flexible belts run. The upper set of rollers may exert pressure downwards by means of bearings which are under adjustable compressed springs to allow for variation in finished thickness of the board being made. The lower rollers may have fixed bearings and oppose the compressive pressure from the upper set. The rollers may be mounted so that the centre of each lower roller is on the same vertical axis as the upper one.

Preferably, each of the means comprised in the apparatus is arranged to act on the first and second plies and/or the outer plies simultaneously and symmetrically about the plane of contact of the first and second plies.

Preferably, adjustment means are provided to alter the path length of the first and/or second plies such that the first and second plies are in a desired relative position when entering the first pressure means.

Preferably, the adjustment means are timing rollers. The timing rollers may pivot.

Preferably, control means are provided to monitor the relative position of the first and second plies and to control the adjustment means to maintain the relative position of the first and second plies at the desired relative position.

Alternatively, adjustment means may be provided to control the speed of the first or second embossed ply with respect to the other of the first or second embossed ply for a short transient period to align the first and second embossed plies in a desired relative position. Preferably, the adjustment means comprises means for retarding or advancing the first or second pair of embossing rollers.

Preferably, the adjustment means controls the speed of one pair of embossing rollers relative to the other pair of embossing rollers. The first pair of embossing rollers may be retarded or advanced with respect to the other pair of embossing rollers.

According to a third aspect of the invention there is provided a high bulk laminated board comprising: a first embossed ply having raised projections; and first and second flat outer plies, the outer plies being attached to first and second sides of the first embossed ply and each outer ply being of printable quality. This results in a 3 ply board.

According to a fourth aspect of the invention there is provided a high bulk laminated board comprising: first and second embossed plies having raised projections, the first and second embossed plies being attached to each other at the raised projections to form a composite ply; and first and second flat outer plies, the outer plies being attached to first and second sides of the composite ply respectively and each outer ply being of printable quality. This results in at least a 4 ply board.

Preferably, the embossed ply or plies further comprise lowered projections. The embossed ply or plies may each have alternating raised and lowered projections.

Preferably, the embossed ply or plies are embossed with a globular (cup and ball) pattern.

Preferably, the outer plies are formed of high quality plain or printed un-embossed material in white or an array of colours.

Preferably, the embossed ply or plies and the outer plies are composed of cellulose based fibre.

Preferably, the embossed ply or plies comprise 110 gsm paper that can be white or coloured. The embossed ply or plies preferably have a minimum weight of 70 gsm and preferably a maximum weight of 250 gsm.

Preferably, the outer plies comprise 270 gsm coated boxboard (GC2). The outer plies preferably have a minimum weight of 150 gsm and a maximum of 750 gsm.

Preferably, a 4 ply board made with 2 plies of embossed 110 gsm Unglazed Bleached Kraft and 2 plies of 270 gsm Coated Boxboard (GC2) will have a finished thickness of 5 mm.

Preferably, a 3 ply board made with 1 ply of embossed 110 gsm Unglazed Bleached Kraft and 2 plies of 270 gsm Coated Boxboard (GC2) will have a finished thickness of 3 mm.

A plain un-embossed centre ply may be provided between the first and second embossed plies. This results in a 5-ply board.

Other weights of plies, colour finishes, printed and plain finishes, and types of paper may be used.

Alternative materials such as plastics, metals and other papers or a combination thereof may be used.

The present invention includes any combination of the herein referred to features or limitations.

BRIEF DESCRIPTION OF THE DRAWINGS

FIG. 6 is a cross-section of the apparatus for manufacturing high bulk laminated board according to an alternate embodiment of the invention.

DETAILED DESCRIPTION OF THE PREFERRED EMBODIMENTS

Figure 1:
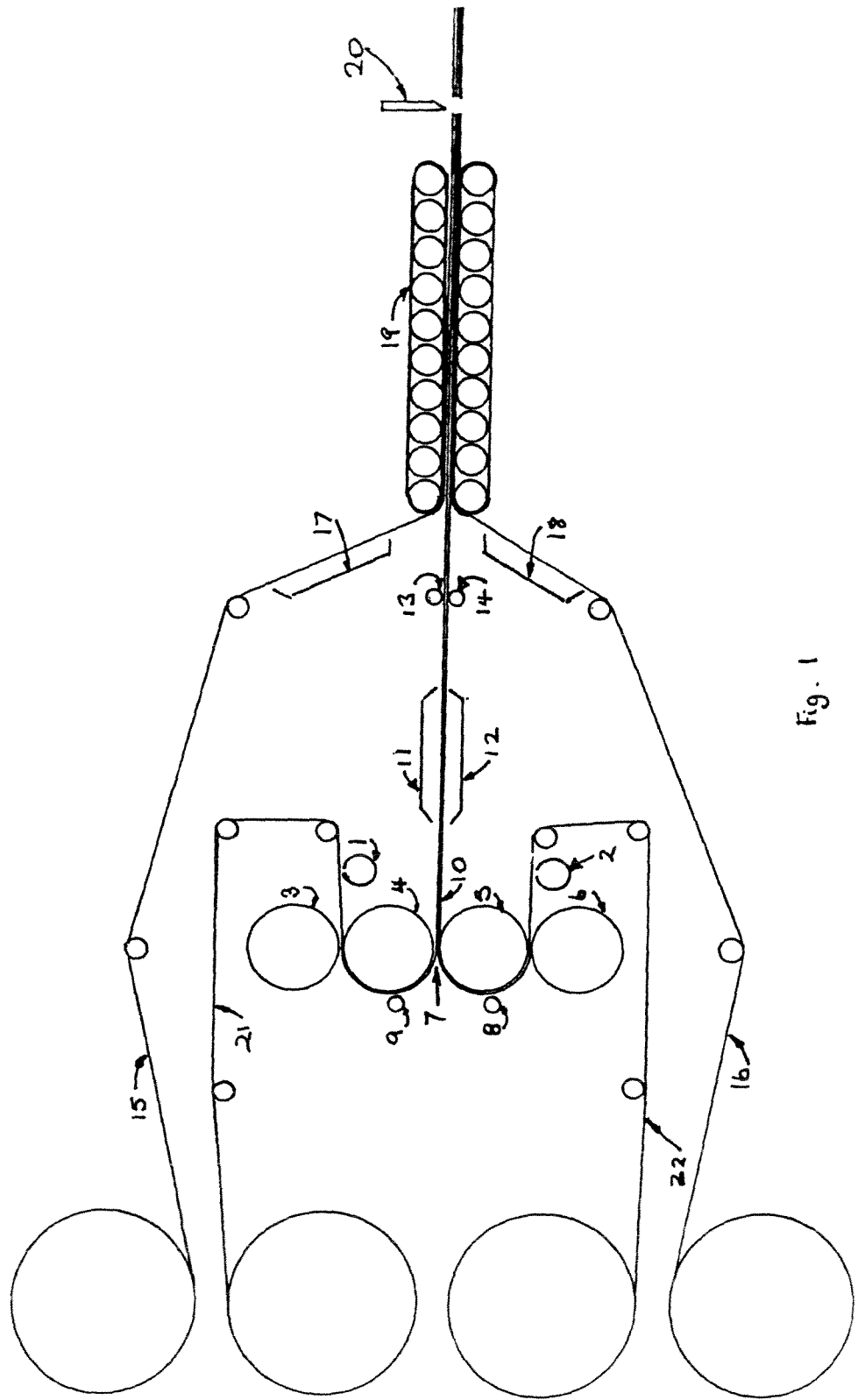
FIG. 1 is a cross-section of the apparatus for Manufacturing high bulk laminated board according to a preferred embodiment of the invention.

In FIG. 1, the diagram of the cross section of the apparatus shows the reels of liner plies and middle plies being fed through the machine to make a 4 ply construction. Middle plies 21 and 22 may be conditioned by the addition of steam at perforated pipes 1 and 2. The embossing rollers 3 and 4 intermesh to emboss the paper or board as do embossing rollers and 5 and 6. The plies are embossed with identical globular (cup-and-ball) patterns. Rollers 3, 4, 5 and 6 are steam heated to facilitate deep embossing.

Rollers 3 and 4 are geared together so that they intermesh. They are mounted in a steel frame so that top roller 3 can be moved vertically relative to bottom roller 4 to allow adjustment for different thicknesses of paper or board to be embossed.

Rollers 5 and 6 are geared together so that they intermesh. They are mounted in a steel frame so that bottom roller 6 can be moved vertically relative to top roller 5 to allow adjustment for different thicknesses of paper to be embossed.

The steel frame in which rollers 3 and 4 are mounted is made with a vertical slide mounting so that it can be adjusted in height relative to roller 5. This allows for adjustment to accommodate different thicknesses of paper or board at the nip 7 formed between rollers 4 and 5.

Roller 4 is geared by a jockey wheel tensioned, continuous chain via a reversing gear to roller 5 so that they run at the same speed. The sprocket wheel over which the chain runs on roller 4 can be rotated and locked in position to allow precise positioning of roller 4 in relation to roller 5.

Rollers 4 and 5 are aligned so that the high points of their embossed patterns face one another mirror fashion and form a nip 7.

All rollers 3, 4, 5 and 6 are driven.

Having been embossed, the plies 21 and 22 are supported by the rollers 4 and 5 which run against gluing stations 8 and 9. Adhesive is applied by smooth rollers which contact only the raised pattern of the embossed plies. The gluing stations 8 and 9 are positioned so that the distance between them and the nip 7 are the same.

Plies 21 and 22 pass through the nip 7 where they bond together to form a laminated composite centre ply 10 and the adhesive is fully dried by dryers 11 and 12.

Both sides of the laminated centre ply 10 are then coated with adhesive at glue stations 13 and 14 in the same manner as at 8 and 9. Glue stations 13 and 14 are located at the same distances from the press section 19. The adhesive is applied only to the raised areas of the embossed pattern.

Outer plies 15 and 16 are pre-heated at points 17 and 18 which are spaced at the same distance from the press section 19. This reduces the moisture content of the liners to compensate for the addition of moisture from the adhesive at 13 and 14.

The outer plies 15 and 16 are brought into contact simultaneously with the centre laminated ply 10 and bonded by passing through the press section 19.

The outer plies 15 and 16 may be pre-printed, i.e. printed on the reel before being used in the above apparatus. Alternatively, the outer plies 15 and 16 may be printed once bonded to the centre laminated ply 10.

Press section 19 is made up of two sets of horizontally mounted rollers, over which continuous flexible belts run. The upper set of rollers exerts pressure downwards by means of bearings which are under adjustable compressed springs. This pressure adjustment is to allow for variation in finished thickness of the board being made. The lower rollers have fixed bearings and oppose the compressive pressure from the upper set. The rollers are mounted so that the axis of rotation of each lower roller is in the same vertical plane as the upper roller. Press section 19 provides traction to pull the plies through the machine.

After passing through the press section the finished board is supported by a conveyor belt to keep it flat before it is side trimmed and cut to sheets at cutter station 20.

In this description the design of the embossed pattern is Globular (cup-and-ball) but it is envisaged that other patterns of emboss design could be used following the same principles outlined herein.

A five ply board may be made by introducing a plain un-embossed ply as the centre ply at nip 7. This would incorporate the benefits of registered positioning of the embossed pattern plies and the subsequent balanced application of adhesive, heat and pressure.

A three ply board may be made by omitting middle ply 21 or 22. No adhesive is applied at either 8 or 9. The nip 7 is opened to allow the embossed web to pass through without contact and adhesive is applied at 13 and 14. The face liners 15 and 16 are bought into contact with the embossed middle and bonded in press section 19.

A two ply laminate may be made by embossing one middle ply, either 21 or 22. No adhesive is applied at 8 or 9 before it passes through the opened nip 7 without making contact. Adhesive is applied to one side only as appropriate at either glue station 13 or 14 to adhere to one face ply which can be either 15 or 16. Bonding is accomplished at press section 19.

Figure 2:
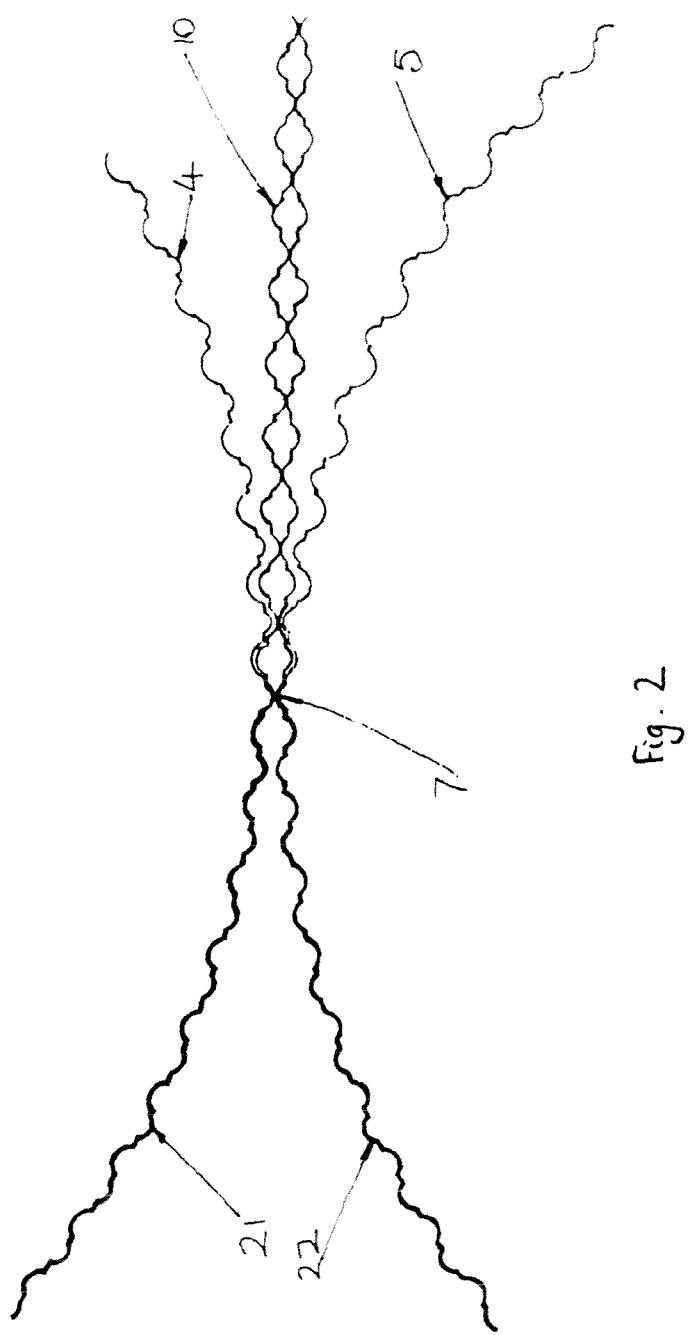
FIG. 2 is a cross-section through a portion for FIG. 1 showing the detail of how the two embossed middle plies are brought together.

In FIG. 2 the laminated centre ply 10, for the production of 4 ply board, is formed at the nip 7 by the embossing rollers 4 and 5 which carry the embossed paper or board plies 21 and 22.

Figure 3:
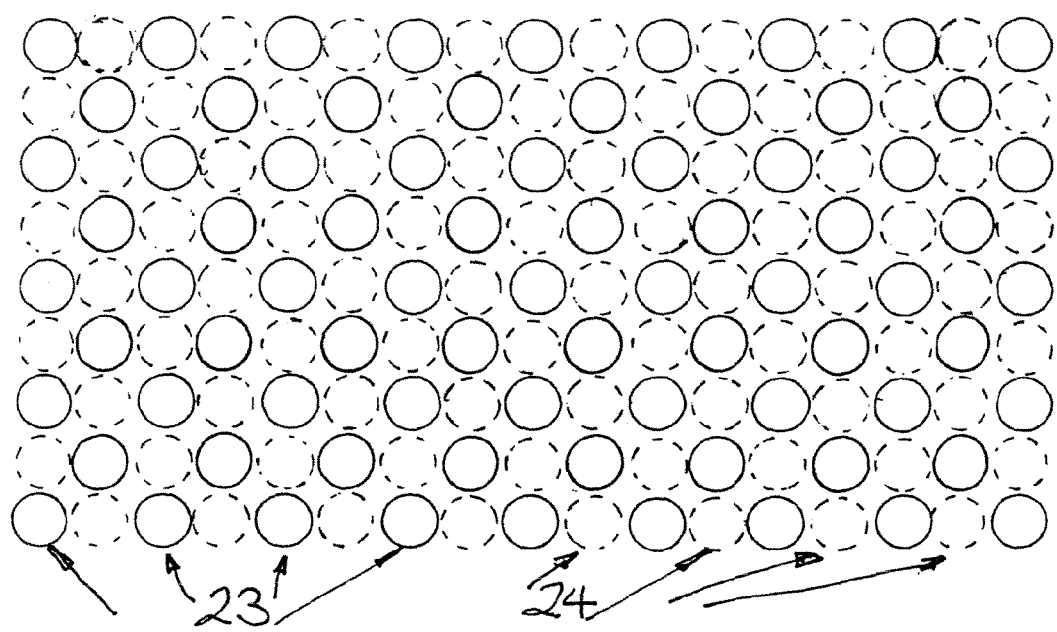
FIG. 3 is a plan view of the embossed plies of FIG. 2.

In FIG. 3 the plan view of the embossed pattern shows raised domes 23 interspaced in both axes by depressed domes 24 which are indicated by dotted outlines.

Figure 4:
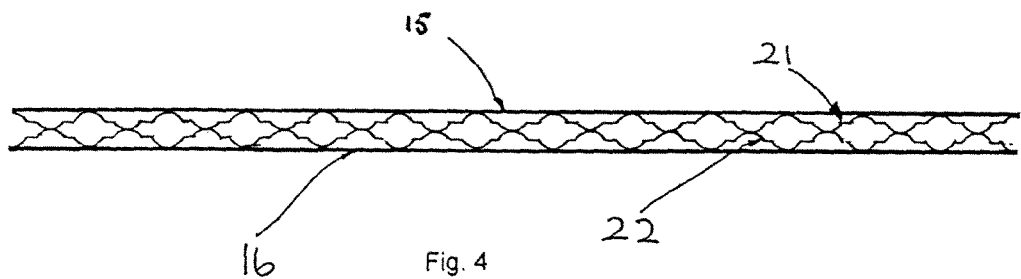
FIG. 4 is a cross-section of the finished 4 ply board.

In FIG. 4 the cross sectional view of the finished 4 ply board is shown. The thickness of the board can be varied by changing the depth of the embossed pattern and the thickness of the plies.

Figure 5:
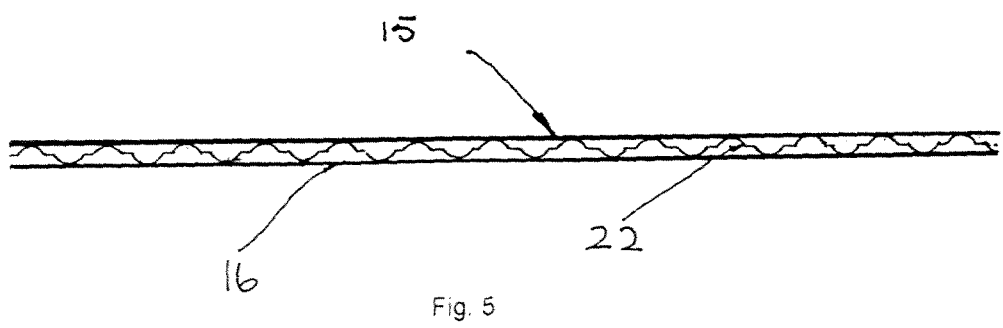
FIG. 5 is a cross-section of the finished 3 ply board.

In FIG. 5 the cross sectional view of the finished 3 ply board is shown. The thickness of the board can be varied by changing the depth of the embossed pattern and the thickness of the plies.

The results of rigidity tests carried out on laminated boards according to the present invention will now be described.

A test apparatus was used comprising a back board having two 100 mm×15 mm diameter rods mounted horizontally thereon in the same horizontal plane, perpendicular to the face of the back board. The rods were mounted with the distance between their respective longitudinal axes being 300 mm. A line was marked connecting the top edges of the rods. At the centre point of the line a millimeter scale was mounted vertically to measure the deflection from the line.

Strips of board measuring 40×350 mm were cut from laminated board samples. Two strips were cut from each sample, one along and one across the machine direction of the board.

One of the strips was placed gently onto the 15 mm diameter rods. A cylindrical weight measuring 22 mm×37.5 mm (height×diameter) weighted to 250 g was gently placed on the centre of the strip. The bottom edge of the strip was measured for deflection after 5 minutes. The strip was then turned over and the process repeated. The cycle was repeated again resulting in four measurements.

By allowing 5 minutes before taking the reading, the board was allowed to deform and settle at a relatively stable measurement. By turning the strips over any prior bow in the board was countered in the averaged readings. Reversing the sides also revealed inherent weaknesses in some boards such as EB corrugated where one side is more resistant to compression and is therefore more rigid than the other. Taking four readings allowed for any variation in the strength of the board caused by its being stressed several times.

The whole process was repeated for both machine directions in each type of board and the four readings for each sample were averaged to give the following results:
- A) 5 Ply Board according to the present invention made using 270 gsm Coated Carton Board facings (GC2), 110 gsm Bleached Kraft middles embossed with 3 mm Globular Dies, 44 gsm Bleached Kraft un-embossed plain centre ply. Thickness of board 6 mm.
- B) 5 mm (nominal) Foam Board made using Coated Solid Bleached Sulphate (SBS) Board Facings and Microcellular Expanded Polystyrene core. Actual thickness 5.0 mm.
- C) 3 Ply Board according to the present invention made using 270 gsm Coated Cartonboard facings (GC2), 110 gsm Bleached Kraft middles embossed with 3 mm Globular Dies. Thickness of board 3.6 mm.
- D) 3 mm (nominal) Foam Board made using Coated Solid Bleached Sulphate (SBS) Board Facings and Microcellular Expanded Polystyrene core. Actual thickness 3.7 mm.

TABLE 1

Results of rigidity tests

| Board Sample | Cross Machine | Long Machine | Average Cross/Long |
|---|---|---|---|
| A | 7.00 mm | 4.25 mm | 5.63 mm |
| B | 7.75 mm | 4.00 mm | 5.88 mm |
| C | 20.50 mm | 10.50 mm | 15.50 mm |
| D | 19.50 mm | 7.50 mm | 13.50 mm |

It can be seen that the 5-ply board of the present invention (sample A) compared very favourably in rigidity with the 5 mm foam board (sample B). Also, the 3-ply board of the present invention (sample C) compared very favourably in rigidity with the 3 mm foam board (sample D).

The invention thus enables the production of high bulk rigid lightweight board incorporating one or more middle plies of embossed paper or board. When more than one middle ply is used, the plies are register laminated to each other with or without intermediate plain plies. The one or more middle plies are provided with one or two high quality facings suitable for printing.

The register laminating produces controllably consistent levels of high rigidity and crush resistance from face to face of the board.

The apparatus described with respect to FIG. 1 relies on the rollers 3,4,5 and 6 being synchronized such that the high points of the embossed patterns face one another mirror fashion to form a nip 7.

The alignment of the embossed plies 21,22 of FIG. 1 relative to each other may be controlled by controlling the speed of the embossing rollers 3 and 4 in relation to the embossing rollers 5 and 6 for a short period of time. Once the desired alignment (or register) is reached, the two pairs of embossing rollers 3,4 and 5,6 are locked in position relative to each other.

An alternative arrangement for aligning the embossed plies is shown in FIG. 6. This arrangement allows the relative alignment of embossed plies 121 and 122 to be precisely adjusted in the direction of travel of the plies. This alignment can either be such that the high points of the embossed plies are aligned directly opposite each other in mirror fashion, or in the case of 5 ply such that the high points are offset by a desired distance.

The arrangement of FIG. 6 comprises two pairs of embossing rollers 103, 104 and 105, 106 respectively, two bonding rollers 130 and 132, and a timing arrangement 134, and intermediate rollers 144,146. The pairs of embossing rollers 103, 104 and 105, 106 each form an embossing nip. The bonding rollers 130, 132 form a bonding nip.

The timing arrangement 134 comprises a first timing roller 136 for use with the upper embossed ply 121 and a second timing roller 138 for use with the lower embossed ply 122. Each timing roller 136, 138 is pivotally mounted such that it can move into and out of contact with the respective ply 121,122 to change the path length of the ply between the embossing nip and the gluing nip.

If the path length of one embossed ply is longer than the other this will create a phase shift between the embossed plies so that, for example, the high points of embossed ply 121 can meet exactly with the high points of embossed ply 122.

For example, if the timing roller 138 is raised, then the distance ACB is greater than AB so the embossed ply 122 will retard relative to the embossed ply 121, creating a phase shift. Similarly if timing roller 136 is lowered, then the embossed paper 121 will be retarded with respect to the embossed paper 122.

The embossing rollers 103,104,105 and 106 need only one drive, as the embossed plies 121, 122 may be adjusted by the timing arrangement 134 to give a required phase shift to the plies 121,122, for example a 180 degree phase shift.

By adding an electrical control system (not shown) to control the timing rollers 136,138, transient changes in phase can be controlled. The control system comprises a reference signal corresponding to the profile of one of the embossed plies 121 and 122, a feedback signal corresponding to the other if the embossed plies 121 and 122, a frequency comparator, a phase comparator and a means of driving the position of the rolls according to the required control function. The reference and feedback signals are obtained using sensors 140, 142. The sensors 140, 142 may be, for example, photoelectric means or mechanical wheels driving encoders.

The control system operates on the following basis, where F is the frequency of the embossed profile and P is the phase of that frequency:—

If Fu>Fl then

Timing roller 136 position change=$(Fu-Fl)+d(Fu-Fl)/dt+(Pu-(Pl+180))$

If Fu<Fl then

Timing roller 138 position change=$(Fl-Fu)+d(Fl-Fu)/dt+(Pl-(Pu+180))$

The control system thus acts as a phase locked loop as it provides feedback to exactly match the frequency and the relative phase of the signals. Furthermore, any change in the alignment of the plies 121 and 122 occurring during use can be automatically compensated.

The control system thus registers the position of the two embossed paper plies to ensure that their respective positions can be controlled when they are adhered either directly together or to a layer of paper between.

Although registering the high points (tops) of the embossed plies 121, 122 with one another creates the highest level of rigidity and anti-crush strength, it may also be desirable to offset the high points. This arrangement thus allows precise control of relative alignment of the plies 121 and 122, regardless of whether it is desired to align the embossed plies top to top, valley to top, or any position in between depending on the desired compressibility of the finished board.

In the arrangement of FIG. 6 adhesive is applied to embossed plies 121,122 at gluing stations 148,150 respectively before the embossed plies 121,122 enter the bonding nip. Adhesive is applied to the tops of the raised pattern on the embossed plies 121 and 122 which are to be brought into contact, either directly with each other or with an intermediate centre ply.

Although the embodiment of FIG. 6 shows apparatus for producing a 4 ply board, a fifth ply may be introduced as a centre ply between the embossed plies 121,122. The fifth ply enables the tops of the balls to remain aligned in the plane of the finished board where an offset of the alignment of the balls is required.

The alignment of the embossed plies 121,122 of FIG. 6 relative to each other may alternatively be controlled by controlling the speed of the embossing rollers 103 and 104 in relation to the embossing rollers 105 and 106 for a short period of time, for example by retarding one said pair of rollers. Once the desired alignment (or register) is reached, the two pairs of embossing rollers 103,104 and 105,106 are locked in position relative to each other. This arrangement would replace the timing arrangement 134.

The method and apparatus for producing the board use simultaneous and symmetrical applications of adhesive, heat and pressure, so minimising warping due to stress created by moisture imbalance from face to face of the finished board.

The board is produced in a way so as to produce a low moisture content which is in balance from face to face of the finished sheet with consistent maximum crush strength from face to face.

The open construction allows free circulation of air through the board to maintain moisture balance and avoid warping.

Intermediate drying reduces the moisture content of the board for stability.

The board is preferably composed entirely of cellulose fibre based plies which is an easily recyclable alternative to Foam Board which is a composite of cellulose fibre based liners and a plastic foam centre.

The board in 4 ply format is uniform in construction because of the registered point-to-point lamination of the middle plies whereas Cushion Pad can vary. This gives it a controllable performance in terms of maximum crush resistance and rigidity.

The board has the same construction both across and along the machine direction, whereas Corrugated Board has flutes which make it much weaker in one direction. Furthermore, there are no flute shadow problems as in Corrugated Board. The method of manufacture produces board with both faces of equally high levels of smoothness without the bruising and wash boarding associated with Corrugated Board.

The smooth outer plies have a clay coated finish for high quality printing.

The board of the present invention is less likely to warp than conventional cellulose fibre based boards because of moisture imbalance from face to face due to the method of production which simultaneously subjects the plies either side of the centre line to the same degrees of applications of adhesive, heat and pressure.

The application of heat at intermediate points in the production machine permits the removal of moisture resulting in a lower moisture content in the finished board.

It is cheaper to make 4 ply than a 5 ply construction because it does not have a plain intermediate ply, yet it is still substantially fit for the same purpose. Four ply is lighter than 5 ply construction. A 4 ply board would require less adhesive than 5 ply so reducing the tendency to flatten the embossing due to the softening effect of the higher moisture content.

Because the embossed middle plies of the 4 and 5 ply board meet in register, high levels of pressure can be used to ensure a stronger bond.

Where compression rather than rigidity is desirable the raised embossed balls can be offset in register to provide a consistent reduction in firmness.

The present invention has the further advantage that the thickness of the finished board can be varied by changing the depth of the embossing of the embossed plies. Furthermore the rigidity of the board can be easily varied by changing the weight and strengths of the materials used.

Alternative materials such as plastics, metals and other papers or a combination thereof could also be used for a broad range of end uses.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. method of producing a laminated board for use in the production of large displays, show-cards, graphic panels and the like, comprising:
   embossing first and second plies to produce raised projections and recessed depressions in each of the first and second plies;
   placing adhesive on the raised projections of each of the first and second embossed plies;
   bringing the first and second plies together to be attached by the raised projections;
   applying pressure to the tops of the raised projections to cause the first and second embossed plies to adhere together to form a composite ply; and
   adhering first and second flat outer plies simultaneously onto first and second sides of the composite ply,
   wherein the raised projections and recessed depressions in each of the first and second plies are produced in an alternating symmetrical manner along both a length and a width of the first and second plies, and
   wherein the recessed depressions in each of the first and second plies are aligned during the step of bringing the first and second plies together to form projections extending from the first and second sides of the composite ply, and wherein the first and second flat outer plies are adhered to the projections extending from the first and second sides of the composite ply.

2. The method of claim 1, further comprising conditioning the first and second plies by the addition of steam before embossing the first and second plies, and wherein the conditioning of both the first and second plies is carried out at substantially equal distances from a location at which embossing of the plies takes place.

3. The method of claim 1, further comprising preheating each outer ply before pressing each said outer ply to a respective side of the composite ply, wherein the preheating of the outer plies takes place at locations which are spaced at substantially equal distances from a location for pressing the outer plies to the composite ply.

4. The method of claim 1, where placing the adhesive on the first and second plies is carried out at substantially equal distances from a location at which pressure is applied to the tops of the raised projections.

5. The method of claim 1, wherein the first and second plies are embossed in a two-dimensionally symmetrical pattern.

6. The method of claim 1, wherein the embossing of the first and second plies comprises feeding the first and second plies into embossing rollers that intermesh to emboss the first and second plies to have the same construction both across and along a direction of the embossing rollers.

7. The method of claim 1, wherein raised projections and recessed depressions in each of the first and second plies have a cup and ball profile.

8. The method of claim 1, wherein a center ply is introduced between the first and second embossed plies.

* * * * *